(12) United States Patent
Magdon-Ismail et al.

(10) Patent No.: US 9,230,001 B2
(45) Date of Patent: Jan. 5, 2016

(54) INTELLIGENT DATA PROPAGATION USING PERFORMANCE MONITORING

(71) Applicant: VMware, Inc., Palo Alto, CA (US)

(72) Inventors: Tariq Magdon-Ismail, San Jose, CA (US); Razvan Cheveresan, Redwood City, CA (US)

(73) Assignee: VMware, Inc., Palo Alto, CA (US)

( * ) Notice: Subject to any disclaimer, the term of this patent is extended or adjusted under 35 U.S.C. 154(b) by 181 days.

(21) Appl. No.: 14/080,718

(22) Filed: Nov. 14, 2013

(65) Prior Publication Data

US 2015/0134607 A1 May 14, 2015

(51) Int. Cl.
*G06F 17/30* (2006.01)
*H04L 12/26* (2006.01)

(52) U.S. Cl.
CPC .......... *G06F 17/30575* (2013.01); *H04L 43/16* (2013.01)

(58) Field of Classification Search
CPC ............... G06F 17/30575; G06F 17/30327; G06F 17/30566; H04L 43/16
USPC ......................................... 707/610, 626, 639
See application file for complete search history.

(56) References Cited

U.S. PATENT DOCUMENTS

| | | | | |
|---|---|---|---|---|
| 6,910,148 B1 * | 6/2005 | Ho | ........................... | H04L 45/00 714/4.4 |
| 7,069,467 B2 * | 6/2006 | Asako | ................. | G06F 11/2005 370/216 |
| 7,389,292 B2 * | 6/2008 | Prakash | ................ | G06F 3/0601 1/1 |
| 7,464,386 B2 * | 12/2008 | Millington | ........ | G06F 17/30867 707/E17.005 |
| 7,552,214 B2 * | 6/2009 | Venkatasubramanian | ........................ | G06F 3/0601 707/999.202 |
| 7,747,730 B1 * | 6/2010 | Harlow | ............... | H04L 12/2697 709/202 |
| 7,778,958 B2 * | 8/2010 | Rand | ................... | G06F 11/1469 707/609 |
| 7,822,726 B1 * | 10/2010 | Cardin | ................ | G06F 11/1435 707/702 |
| 7,860,824 B2 * | 12/2010 | Suzuki | ................ | G06F 11/2082 707/609 |
| 7,873,601 B1 * | 1/2011 | Kushwah | ............ | G06F 11/1451 707/654 |
| 7,890,459 B1 * | 2/2011 | Linstead | ........... | G06F 17/30286 707/610 |
| 7,934,065 B2 * | 4/2011 | Iwamura | ............. | G06F 11/1662 707/610 |
| 8,204,854 B2 * | 6/2012 | Ahmed | ................. | G06F 3/0605 707/610 |
| 8,310,957 B1 | 11/2012 | Rekhter | | |
| 8,498,966 B1 * | 7/2013 | Waghole | ............. | G06F 11/1461 707/645 |
| 8,756,598 B1 * | 6/2014 | Costea | ................ | G06F 9/45558 717/174 |

(Continued)

OTHER PUBLICATIONS

Qureshi et al., Exploring Proximity Based Peer Selection in a BitTorrent-like Protocol, MIT, May 7, 2004, 10 pages.

(Continued)

*Primary Examiner* — Hanh Thai

(57) ABSTRACT

Exemplary methods, apparatuses, and systems that can intelligently copy data to a plurality of datastores using performance monitoring are described. In one embodiment, a shortest path tree determines the most efficient paths available for copying data from a source datastore to one or more destination datastores. During the copying of the data between a source datastore and the one or more destination datastores, a performance value of each of the datastores involved in the copying process is compared to a threshold. In response to determining that the performance value of a given source or destination datastore involved in the copying exceeds the threshold, the copying of the data to the corresponding destination datastore is suspended. An updated shortest path tree is determined to locate a more efficient path for copying data to the suspended destination datastore. Copying is resumed to the suspended destination datastore using the updated shortest path tree.

20 Claims, 7 Drawing Sheets

(56) References Cited

U.S. PATENT DOCUMENTS

| | | | |
|---|---|---|---|
| 8,789,208 B1* | 7/2014 | Sundaram | H04L 29/06 726/28 |
| 8,832,039 B1* | 9/2014 | Sorenson, III | G06F 7/00 707/679 |
| 8,856,078 B2* | 10/2014 | Knowles | G06F 9/45558 707/649 |
| 2003/0078903 A1* | 4/2003 | Kimura | G06F 11/2064 1/1 |
| 2004/0004938 A1 | 1/2004 | Buddhikot | |
| 2004/0267747 A1 | 12/2004 | Choi | |
| 2005/0102297 A1 | 5/2005 | Lloyd | |
| 2006/0101217 A1* | 5/2006 | Maki | G06F 11/2069 711/162 |
| 2006/0224636 A1* | 10/2006 | Kathuria | G06F 11/1471 1/1 |
| 2006/0294107 A1 | 12/2006 | Feldman | |
| 2007/0086361 A1 | 4/2007 | Allan | |
| 2007/0156330 A1 | 7/2007 | Goldberg | |
| 2008/0183774 A1* | 7/2008 | Otani | H04L 67/1097 1/1 |
| 2009/0074404 A1 | 3/2009 | Suryaputra | |
| 2009/0144515 A1* | 6/2009 | Benari | G06F 11/1471 711/162 |
| 2010/0001993 A1* | 1/2010 | Finn | A63F 13/12 345/419 |
| 2010/0174742 A1 | 7/2010 | Shinjo | |
| 2010/0250499 A1* | 9/2010 | McAlister | G06F 11/1471 707/679 |
| 2010/0274894 A1* | 10/2010 | Devaki | H04L 63/1441 709/224 |
| 2010/0299368 A1* | 11/2010 | Hutchins | G06F 17/30115 707/803 |
| 2012/0144391 A1* | 6/2012 | Ueda | G06F 9/45558 718/1 |
| 2012/0151477 A1* | 6/2012 | Sinha | G06F 9/45558 718/1 |
| 2012/0331462 A1* | 12/2012 | Falko | G06F 9/45533 718/1 |
| 2013/0138801 A1* | 5/2013 | Maralack | G06F 11/3495 709/224 |
| 2013/0263119 A1* | 10/2013 | Pissay | G06F 9/45558 718/1 |
| 2013/0346976 A1* | 12/2013 | Robinson | G06F 9/485 718/1 |
| 2014/0019620 A1* | 1/2014 | Kono | H04L 47/70 709/226 |
| 2014/0067872 A1* | 3/2014 | Kruglick | G06F 17/30079 707/797 |
| 2014/0081920 A1 | 3/2014 | Itasaki | |
| 2014/0109086 A1* | 4/2014 | Mizrahi | G06F 9/45558 718/1 |
| 2014/0173232 A1* | 6/2014 | Reohr | G06F 3/0611 711/162 |
| 2015/0095598 A1* | 4/2015 | Abou Gazala | G06F 3/0647 711/162 |

OTHER PUBLICATIONS

Cox et al., Practical, Distributed Network Coordinates, In Proceedings of The Second Workshop on Hot Topics in Networks, 2003, 6 pages.

Eklund et al., A Dynamic Multi-source Dijkstra's Algorithm for Vehicle Routing, Proc. 1996 Australian New Zealand Conference on Intelligent Information Systems, Nov. 18-20, 1996, 6 pages.

van Dongen, Graph Clustering by Flow Simulation, Centre for Mathematics and Computer Science (CWI) in Amsterdam, May 29, 2000, 173 pages.

Gulati et al., BASIL: Automated IO Load Balancing Across Storage Devices, USENIX Conference on File and Storage Technologies (FAST), Feb. 2010, 14 pages.

Resource Utilization, IBM® Informix 11.50, Release date: Aug. 2011, downloaded at: http://pic.dhe.ibm.com/infocenter/idshelp/v115/topic/com.ibm.perf.doc/ids_prf_053.htm, 2 pages.

Notice of Allowance for U.S Appl. No. 14/080,710, mailed Oct. 14, 2015, 16 pages.

* cited by examiner ively copy data to a plurality of datastores using performance monitoring. In an exemplary embodiment, a shortest path tree determines the most efficient paths available for copying data from a source datastore to one or more destination datastores. During the copying of the data between a source datastore and the one or more destination datastores, a performance value of each of the datastores involved in the copying process is compared to a threshold. In response to determining that the performance value of a given source or destination datastore involved in the copying exceeds the threshold, the copying of the data to the corresponding destination datastore is suspended. An updated shortest path tree is determined to locate a more efficient path for copying the data to the suspended destination datastore. Copying is resumed to the suspended destination datastore using the updated shortest path tree.
INTELLIGENT DATA PROPAGATION USING PERFORMANCE MONITORING

FIELD OF THE INVENTION

The various embodiments described herein relate generally to copying data in a highly distributed environment, and more particularly, to propagating copies of data to multiple host devices in a highly distributed environment.

BACKGROUND OF THE INVENTION

A virtual machine clone is a copy of an existing virtual machine (VM). VMs can be cloned across highly distributed architectures. These highly distributed environments include numerous host devices (e.g., ranging from hundreds to thousands of hosts) and corresponding datastores spread across geographically distinct locations. The speed at which VMs are cloned across a large, highly distributed environment, however, remains sub-optimal. For example, deploying a 200 cluster of VMs across 16 host devices by concurrently cloning a VM from a single template from a source datastore to all destination datastores takes on the order of tens of hours due in part to network and datastore bottlenecks.

Cloning VMs, or creating copies of other data, may be performed by copying an entire file or by copying the file on a per-block basis (e.g., dividing the file to be copied into fragments and copying each fragment from the source to the destination until the entire file has been completely copied). The suboptimal copying speed described above, however, persists regardless of the manner in which the data is copied from the source datastore to the destination datastores.

SUMMARY OF THE INVENTION

Exemplary methods, apparatuses, and systems intelligently copy data to a plurality of datastores using performance monitoring. In an exemplary embodiment, a shortest path tree determines the most efficient paths available for copying data from a source datastore to one or more destination datastores. During the copying of the data between a source datastore and the one or more destination datastores, a performance value of each of the datastores involved in the copying process is compared to a threshold. In response to determining that the performance value of a given source or destination datastore involved in the copying exceeds the threshold, the copying of the data to the corresponding destination datastore is suspended. An updated shortest path tree is determined to locate a more efficient path for copying the data to the suspended destination datastore. Copying is resumed to the suspended destination datastore using the updated shortest path tree.

In one embodiment, a distance value of a path between each datastore in a plurality of datastores is determined. The distance values are used to perform a graph cluster analysis. The graph cluster analysis creates clusters of datastores within close proximity to one another based on the distance values. The source datastore is designated as the root of the shortest path tree and the one or more destination datastores are designated as the vertices of the tree. Each child vertex of the source datastore is ordered in descending order according to a number of unique clusters to which descendants of the child vertex belong and the data is copied from the source datastore to the one or more destination datastores in the descending order.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein intelligently propagate copies of data throughout a plurality of datastores in a highly distributed environment. Embodiments sort the datastores into different clusters based upon determined distance values and prioritize branches of a shortest path tree that include diverse clusters. Additionally, embodiments suspend and resume copying between datastores based upon the performance of each datastore during the copying process. As a result, copies of data can be more rapidly propagated throughout the environment.

Figure 1:
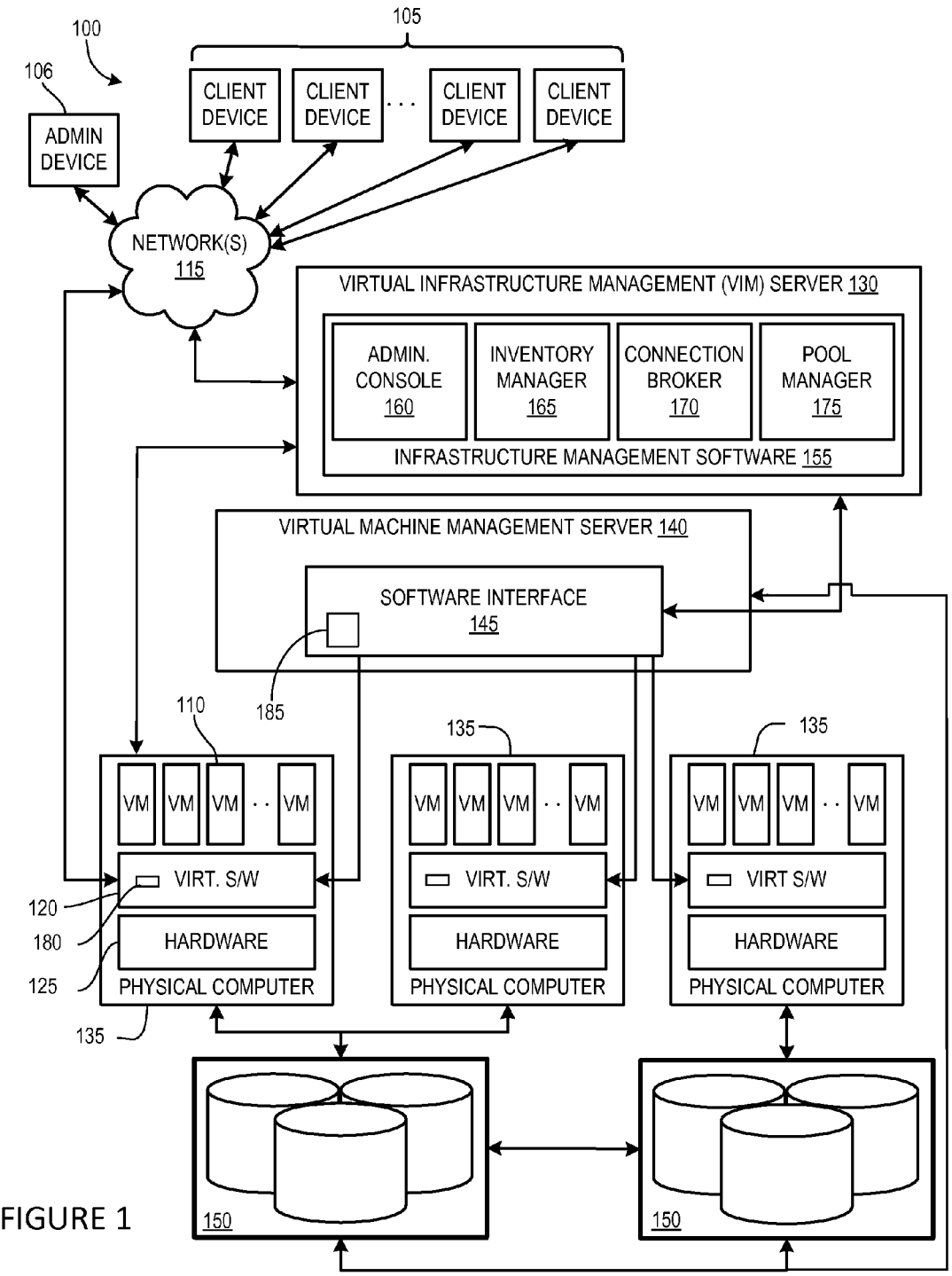
FIG. 1 illustrates, in block diagram form, an exemplary virtual datacenter environment including one or more networked processing devices to implement the intelligent propagation of copies of data throughout a plurality of datastores.

FIG. 1 illustrates, in block diagram form, an exemplary virtual datacenter environment 100 including one or more networked processing devices implementing the intelligent propagation of copies of data throughout a plurality of datastores. Server-based computing in a virtual datacenter environment allows client devices 105 to access centrally-managed user virtual desktops, such as those implemented by VMs 110, via network(s) 115 (e.g., a local area network or other private or publically accessible wide area network, such as the Internet). For example, client device 105 and VM 110 use a desktop remoting protocol such as Remote Desktop Protocol (RDP), Virtual Network Computing (VNC), or Personal Computer over Internet Protocol (PCoIP) to remotely access/provide remote access to a virtual desktop generated by VM 110.

The term "desktop," as used herein, refers to a human interface environment through which users can launch, interact with, and manage applications, settings, and/or data, etc. A virtual desktop is a virtual computing system that operates as a desktop or workstation computer with which an end user can interact using a desktop remoting protocol and the software and/or hardware of client device 105. A virtualized desktop may export user interfaces, e.g., keyboard and mouse input, audio and visual output, to client device 105 from VM 110 running remotely (in the datacenter) or locally on client device 105, or, in some cases, using a hybrid. Client device 105 transmits user input, e.g., keyboard or mouse input, to VM 110 to be processed, and receives display and other data, such as sound, from VM 110 for presentation to a user of client device 105. Client device 105 presents a bitmap representation of the desktop generated by VM 110. Input to and output from the virtualized desktop are reflected in the bitmap representation on client device 105 as it occurs on the virtualized desktop within VM 110.

VMs 110 are complete computation environments, containing virtual equivalents of the hardware and system software components of a physical system and are typically implemented by an extensive virtualization infrastructure, which includes a variety of software and hardware components. A virtualization software layer 120 (e.g., a hypervisor) running on hardware 125 of physical computer 135 manages one or more VMs 110. Virtualization software layer 120 manages physical resources, e.g., hardware 125, as well as maintains virtual-to-physical hardware mappings.

Additionally, virtualization software layer 120 includes propagation agent 180. In one embodiment, propagation agent 180 performs at least a portion of method 200 described below. For example, propagation agent 180 facilitates the transfer of data from a source datastore to a destination datastore. Additionally, a lead propagation agent 180 may communicate with multiple propagation agents 180 to perform method 200. Alternatively, software interface 145 of virtual machine management server (VMMS) 140 includes one or more propagation managers 185 to perform at least a portion of method 200, as described below. While lead propagation agent 180 and propagation manager 185 have been described as alternatives to one another, in one embodiment, lead propagation agent 180 and propagation manager 185 are used together to perform method 200 described below. For example, one or both of lead propagation agent and propagation manager 185 may request and/or receive performance data, propagation status, etc. from propagation agent(s) 180; determine clusters, shortest path trees, etc. and direct host devices 135 and/or datastores 150 to initiate, pause, or resume the propagation of data. For the sake of explanation herein, however, reference will simply be made to propagation manager 185.

In yet another embodiment, datastores 150 include a propagation agent (not shown) to perform one or more of the functionalities described with reference to propagation agent 180 and method 200. In one embodiment, each datastore 150 is a single storage device that stores data for one or more VMs 110. Alternatively, each datastore 150 represents a disk array or other collection data stores. For example, each datastore 150 may implement a redundant array of independent disks (RAID) algorithm to combine multiple drive components into a logical unit and divide and/or replicate data among multiple physical drives. In one embodiment, datastore 150 includes a processing device or other storage controller (not shown).

Remote access to virtualized desktops is generally provided to client devices 105 through virtual infrastructure management (VIM) server 130. In one embodiment, the VIM server 130 provides virtual desktop access to the client devices 105. Additionally, or alternatively, VIM server 130 orchestrates the provisioning of software defined datacenter services. Exemplary services include virtualized compute, networking, storage, and security services that implement the infrastructure of virtual datacenter 100. VIM server 130 manages the corresponding VMs 110 through communications with software interface 145 of VMMS 140. VMMS 140 is responsible for provisioning, cloning, and maintaining the multitude of VMs 110 implemented across one or more physical computers 135 as well as datastores 150 utilized by VMs 110.

VIM server 130 may be a physical computer system or a virtual machine that runs infrastructure management software 155. Infrastructure management software 155 within VIM server 130 manages pools of computer resources to run VMs 110 on a set of clusters typically including multiple servers/physical computers 135 with central/graphics processing units (CPU's and/or GPU's), memory, and communications hardware. Infrastructure management software 155 includes one or more modules, including administrative console 160, inventory manager 165, connection broker 170, and pool manager 175.

Administrative console 160 provides a remotely accessible user interface to administrator device 106 to manage the configuration of VMs 110 within the virtual datacenter 100. In one embodiment, administrative console 160 exports a graphical user interface via hypertext transfer protocol (HTTP) to be accessed by a web browser. Alternatively, a command-line interface or a rich client is provided to administrator device 106, which includes a web browser to access the administrative console. Administrative console 160 allows administrator device 106 to perform a plurality of functions, such as: cloning VMs, creating desktop pools, associating desktop pools with VIM server 130, associating a desktop pool with a master image, defining VM state policies, setting up custom messages to be sent to users (e.g., when the desktops are put into maintenance mode for weekly patches, hotfixes, etc.), setting storage overcommit settings for different datastores 150 used by desktop pools, performing rebalance operations on a set of virtual desktops, configuring firewall and other networking/security services, adding servers, isolating multi-tenant organizations, creating datacenter service templates, defining role-based access, monitoring processor, memory, and storage usage/allocation, pooling resources, and other similar operations. For example, administrative console 160 may provide admin device 106 access to initiate the cloning of a VM to a plurality of datastores 150 as described herein.

Inventory manager 165 handles the events received from VMs 110. For example, when a user of a virtual desktop logs off or disconnects, a software agent running within a VM 110 sends a notification to inventory manager 165. Inventory manager 165 determines an effective policy that applies to the desktop and performs a maintenance operation, if required. Inventory manager 165 may also use timer-based events to schedule effective maintenance operations.

Connection broker 170 allows a remote user or administrator, through a client or administrator device 105, 106, to select a type of virtual desktop and initiate a virtual desktop session or to access an existing connection to a virtual desktop. In one embodiment, connection broker 170 connects to VM 110 to access or update policies associated with VM 110 (e.g., to enable or prohibit virtual desktop shadowing).

Pool manager 175 manages the lifecycle of virtual desktops. Virtual desktops in a pool are grouped together based on similar software requirements. Desktop Administrators create logical desktops groups (desktop pools) that are provisioned typically from the same base image. For example, a desktop pool may include cloned VMs 110 that run the same set of software applications and run the same operating system.

In general, VMMS 140 provides software interface 145 to enable an administrator or other entity, such as inventory manager 165, connection broker 170, and pool manager 175, to access and manage VMs 110 as described above.

VMMS 140 also supports operations for the discovery of compute, storage, and network resources; creation of logical compute pools by providing features such as automatic CPU and memory load balancing; provisioning/creation of one or more virtual disks, on local or shared storage-clones with full or sparse disks; creation of cloned VMs; and power operations on virtual machines (power on, power-off, suspend, resume, checkpoint, etc.).

While illustrated as separate components, in one embodiment, a single server or other networked processing device implements VIM server 130 and VMMS 140. For example, VIM server 130 and VMMS 140 may be implemented by one or more VMs 110.

Figure 2A:
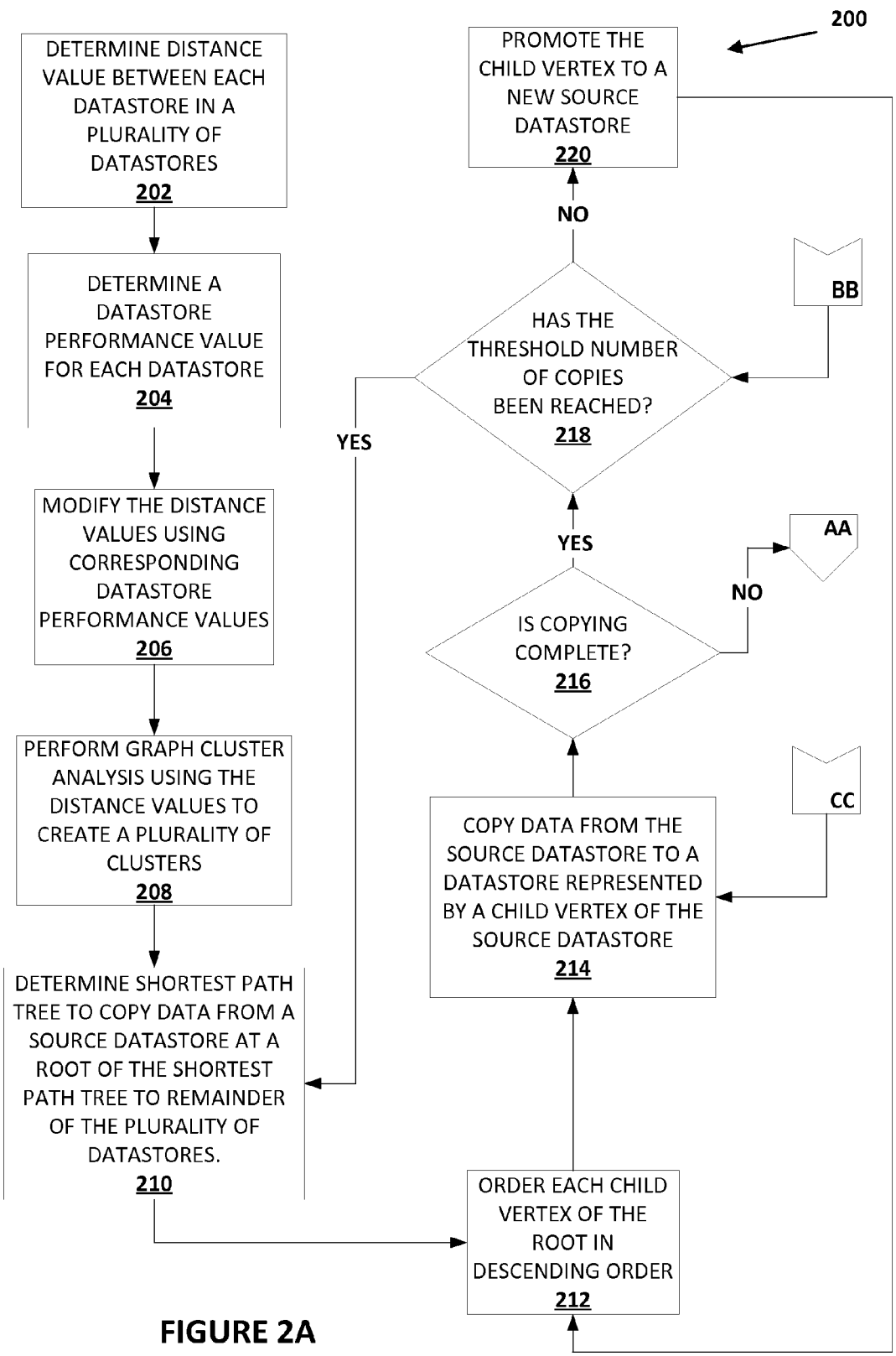
FIG. 2A is a flow chart illustrating an exemplary method of intelligently propagating copies of data throughout a plurality of datastores.
Figure 2B:
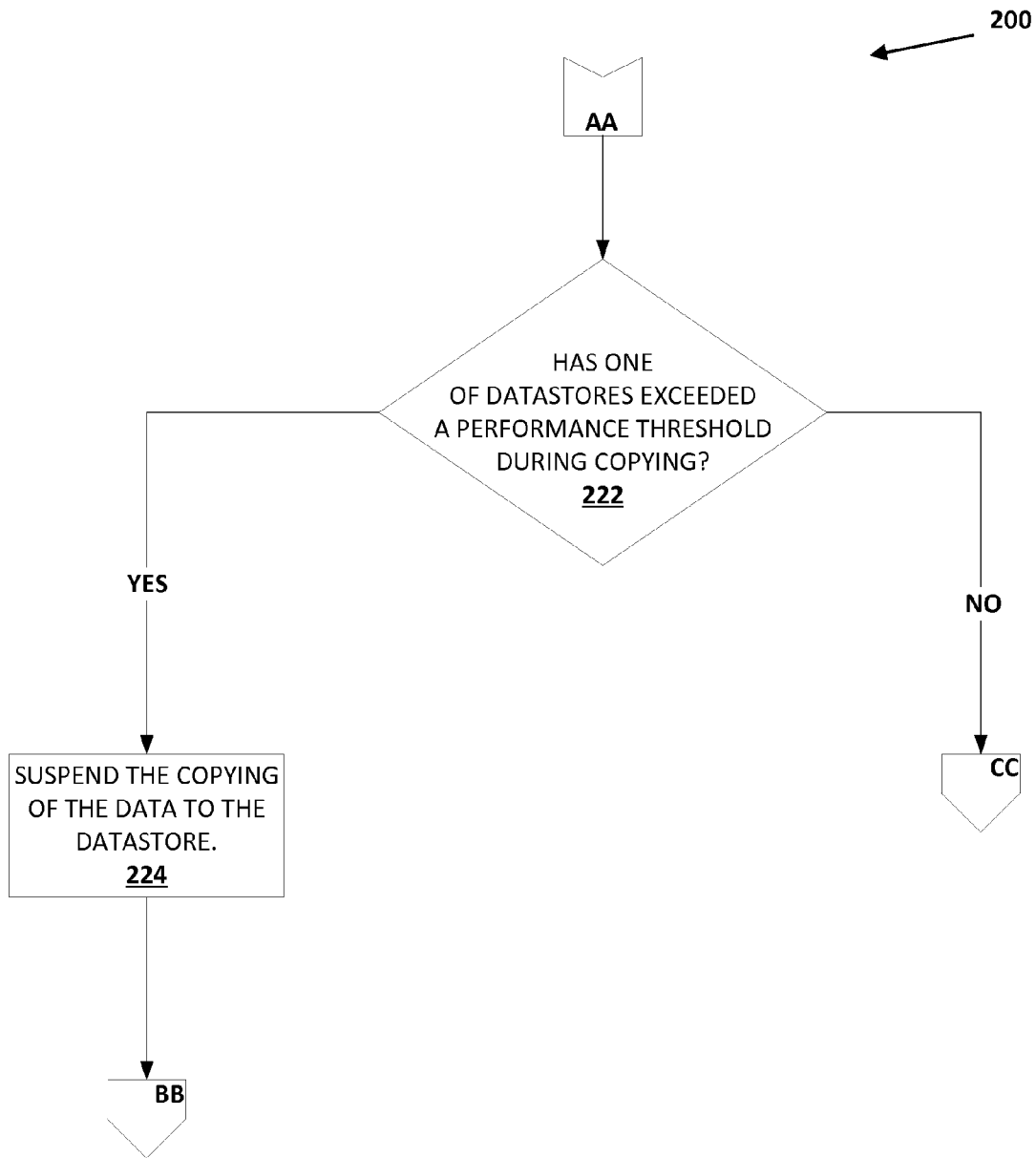
FIG. 2B is a flow chart illustrating additional features of the method of intelligently propagating copies of data throughout a plurality of datastores.

FIG. 2A and FIG. 2B illustrate method 200 of intelligently propagating copies of data throughout a plurality of datastores. For example, the data is copied and propagated throughout datastores 150 in FIG. 1 described above. The data to be copied can be a VM, a snapshot of a VM, the files that make up a VM (e.g., VM log files, virtual disk files, VM redo-log files, VM paging files, VM configuration files, etc.) or any other type of files (related to/unrelated to a VM) that can be propagated across a highly distributed environment. Additionally, the data to be copied can be an entire file or a fragment of a file (e.g., fragments of files used to transfer data between peers in a peer-to-peer protocol such as BitTorrent). While described with reference to virtual datacenter environment 100, method 200 may also be utilized to copy data in other network environments.

In FIG. 2A, at block 202, propagation manager 185 determines a distance value between each datastore 150. The distance value of the path between each datastore 150 is based upon a network performance measurement between datastores 150. For example, the network performance measurement can be based on measurements of network or input/output (I/O) latency.

Network latency refers to a measurement of the amount of time it takes for a packet of data to get from one designated point to another in the network. Examples of measurements to show network latency include, but are not limited to, throughput, bandwidth-delay, bit-error rate, round-trip time (e.g., as determined by a ping test), or any combination thereof. Alternatively, the network latency can be based on measurements of hop counts between each datastore 150.

I/O latency refers to the time in which it takes a datastore to complete a task. Processing unit contention and network bandwidth contention may contribute to I/O latency. There are various ways in which the I/O latency of each datastore 150 could be measured. Examples of these measurements include, but are not limited to, the time it takes a particular datastore 150 to store or retrieve a file of a given size and the time it takes a particular datastore 150 to copy a file of a given size to or from other datastores.

In one embodiment, propagation manager 185 receives network performance data from propagation agents 180. For example, as each host device 135 or datastore 150 determines a corresponding network latency (with respect to each other host device 135 or each other datastore 150) or I/O latency, a corresponding propagation agent 180 provides propagation manager 185 with the corresponding value(s). Propagation manager 185 maintains a table or other data structure to store the received network performance data values.

At block 204, propagation manager 185 optionally determines a datastore performance value for each datastore 150. The datastore performance value can be based on the performance capabilities of each datastore 150. For example, and in one embodiment, the datastore performance value can be based on measurements of resource utilization or I/O speed of each datastore 150.

Resource utilization refers to a measure of how much data storage is available and/or how well the available data storage space in a datastore is used. Resource utilization can also be a measure of the availability of a datastore to process pending tasks. For example, resource utilization may be based upon a number of pending tasks at a given time, an average number of pending tasks for the resource over time, a percentage of time the resource is occupied processing tasks, etc. There are a number of variables that can be used, alone or in combination, to determine the resource utilization of each datastore 150. The relative priorities assigned to each variable can also affect the resource utilization figure. Examples of variables that can be used to determine the resource utilization include, but are not limited to, the total available storage space in each datastore 150, the time-averaged percentage of storage space used in each datastore 150, the percentage of storage space used at times of peak demand in each datastore 150, the number of pending tasks of each datastore 150, the average number of pending tasks of each datastore 150, the percentage of time each datastore 150 spends processing tasks, and the average size of files stored on or retrieved from each datastore 150.

The I/O speed refers to the time it takes a datastore to complete a task determined principally by the period spent waiting for I/O operations to be completed. There are various ways in which the I/O speed of datastore 150 could be measured. Examples of these measurements include, but are not limited to, the average time required to store or retrieve a file of a given size for each datastore 150, the time during peak-demand periods required to store or retrieve a file of a given size in each datastore 150, and the time required to copy a file of a given size from or to each datastore 150.

In one embodiment, both the resource utilization and the I/O speed measurements are based on current or historical values. Furthermore, resource utilization and the I/O speed measurements can be used separately or in combination.

In one embodiment, the datastore performance value is based upon other hardware characteristics for a given datastore 150. For example, the datastore performance value may be based upon processing unit speed, disk speed, etc.

At block 206, propagation manager 185 optionally modifies the distance values between each datastore 150 using the datastore performance values of each datastore 150. For example, the datastore performance value may serve as a multiplier or another weighting value for a corresponding distance value. The modification is performed to create a modified distance value to represent the relative distances between each datastore 150 in combination with the performance capabilities of each datastore 150. An exemplary representation of the result of the processes of blocks 202-206 of method 200 is found in FIG. 3.

Figure 3:
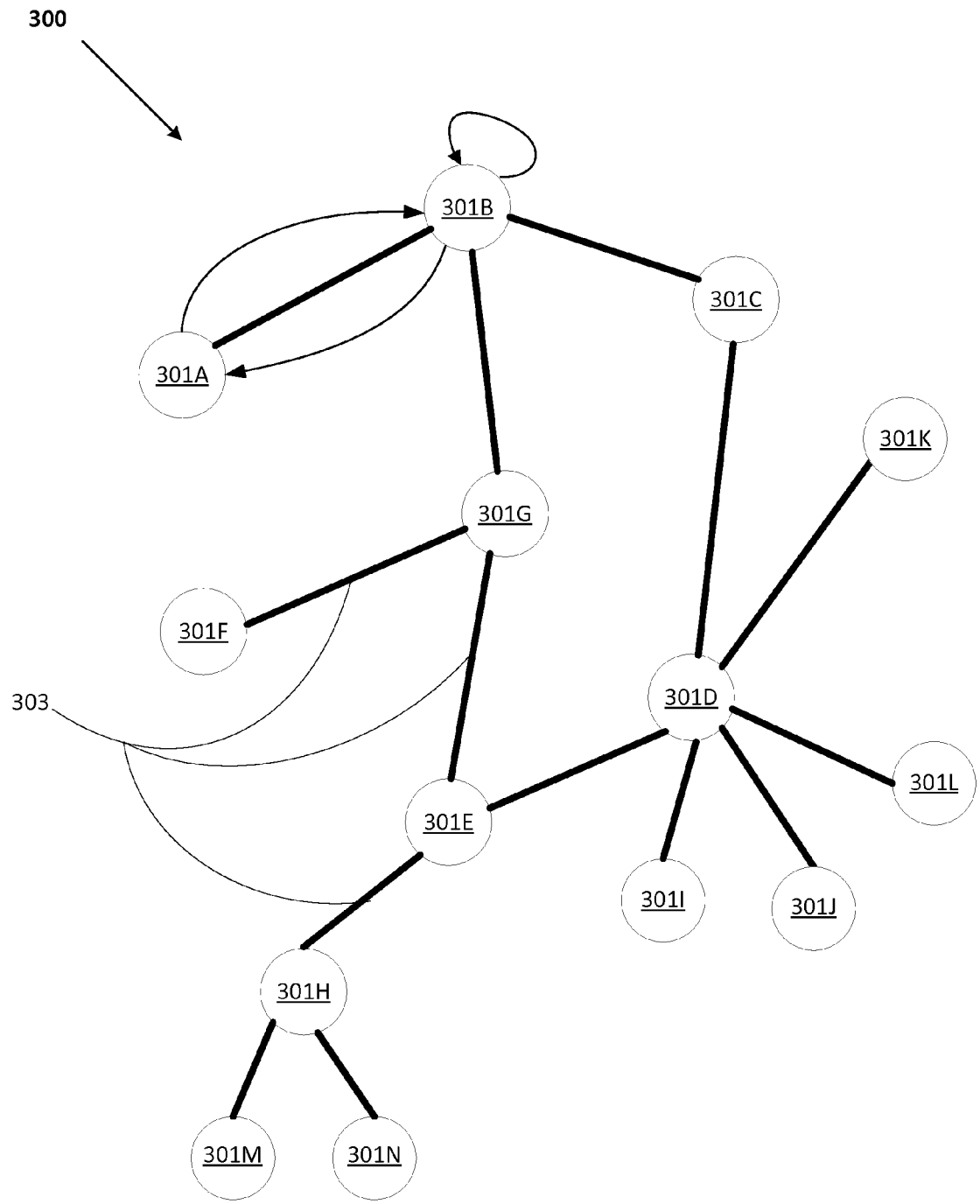
FIG. 3 is a directed graph illustrating paths for copying data between a plurality of datastores according to an embodiment of the invention.

FIG. 3 is a directed graph 300 illustrating paths for copying data between datastores 150. Directed graph 300 shows the relative positions of datastores 150 based on the distance values or modified distance values, e.g., as determined in blocks 202-206 of method 200. A subset of datastores 150 is represented in directed graph 300 as one of nodes 301A-N. A larger or smaller number of datastores may be included in directed graph 300. Between each node is an edge 303, which represents the distance values or modified distance values between the datastores 150. The arrows indicate exemplary directions in which data can be sent. For example, the arrows at node 301B indicate that data can be sent from node 301B to itself (e.g., a VM may be cloned within a datastore 150 for use by the same or a different host device that also accesses the datastore 150), from node 301A to node 301B, and from node 301B to node 301A.

Returning to FIG. 2A, at block 208, propagation manager 185 performs a graph cluster analysis using the distance values or the modified distance values to create a plurality of clusters. Propagation manager 185 may use any of a number of clustering algorithms to create the plurality of clusters. Each cluster includes one or more datastores 150 within close proximity to one another based on the distance values or modified distance values (e.g., as determined in blocks 202-206).

Figure 4:
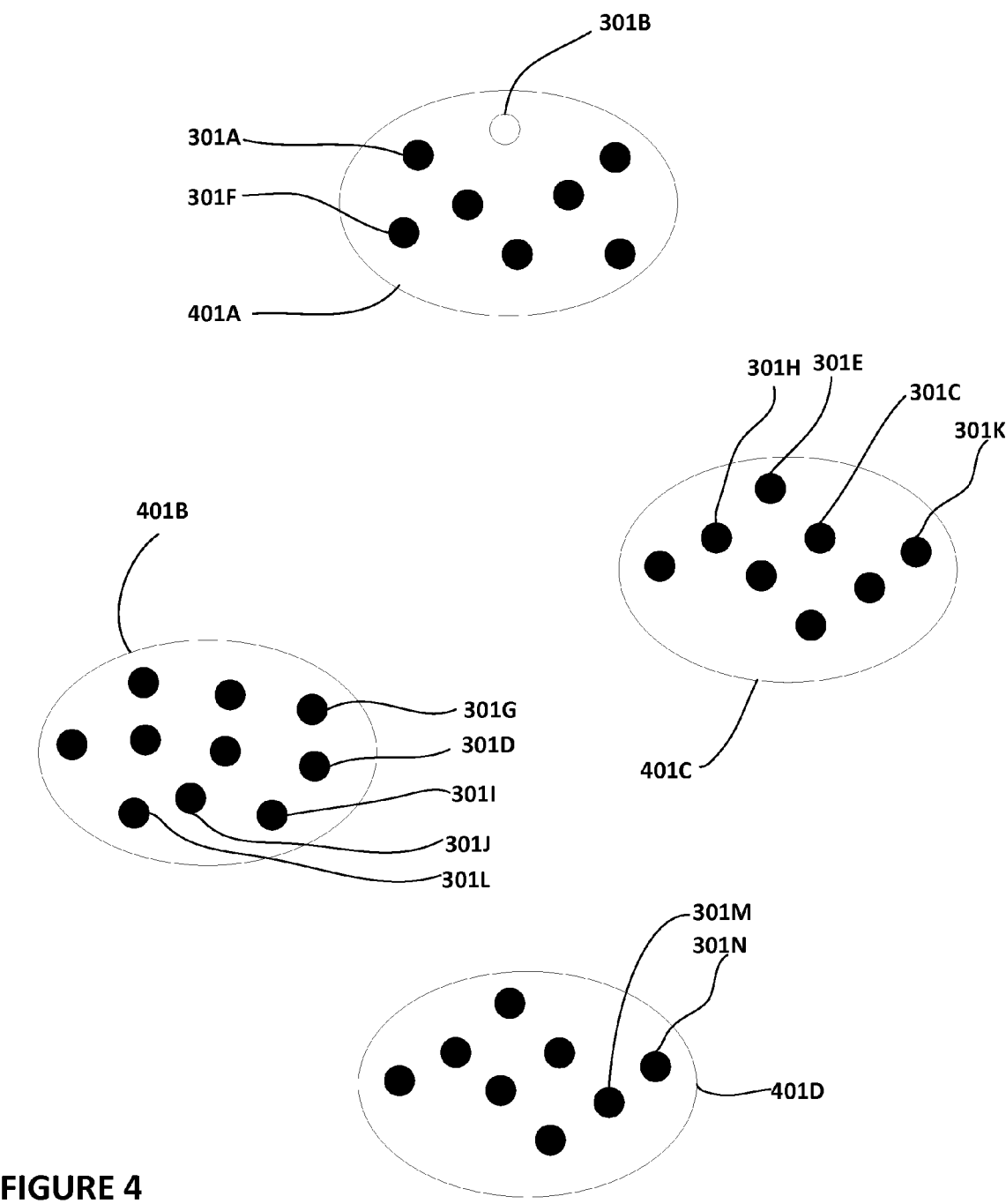
FIG. 4 illustrates a plurality of clusters of datastores created according to an embodiment of the invention.

FIG. 4 is an exemplary illustration of the result of the graph cluster analysis. Clusters 401A-D are made up of a subset of datastores 150 that are in close proximity to one another based on the distance values or modified distance values, including nodes 301A-N described above. For example, nodes 301A, 301B, 301F in cluster 401A represent datastores 150 that are in close proximity to one another. As described further herein, node 301B represents the source datastore, which is the one of datastores 150 that stores the data to be copied to the other datastores 150. The remainder of datastores 150 that receive the copied data are referred to herein as destination datastores. While clusters 401B-D are not illustrated or described as containing any source datastores, clusters 401B-D can contain source datastores. Furthermore, there can be more than one source datastore in one or more of clusters 401A-D.

Returning to FIG. 2A, at block 210, propagation manager 185 determines a shortest path tree to copy data from a source datastore (which is placed at the root of the shortest path tree) to the destination datastores (which are represented as vertices on the shortest path tree). For example, propagation manager 185 utilizes Dijkstra's algorithm (using a single or multiple sources) or another shortest path algorithm to select edge(s) 303 in directed graph 300 to copy the data from node 301B to nodes 301A and 301C-N.

Figure 5:
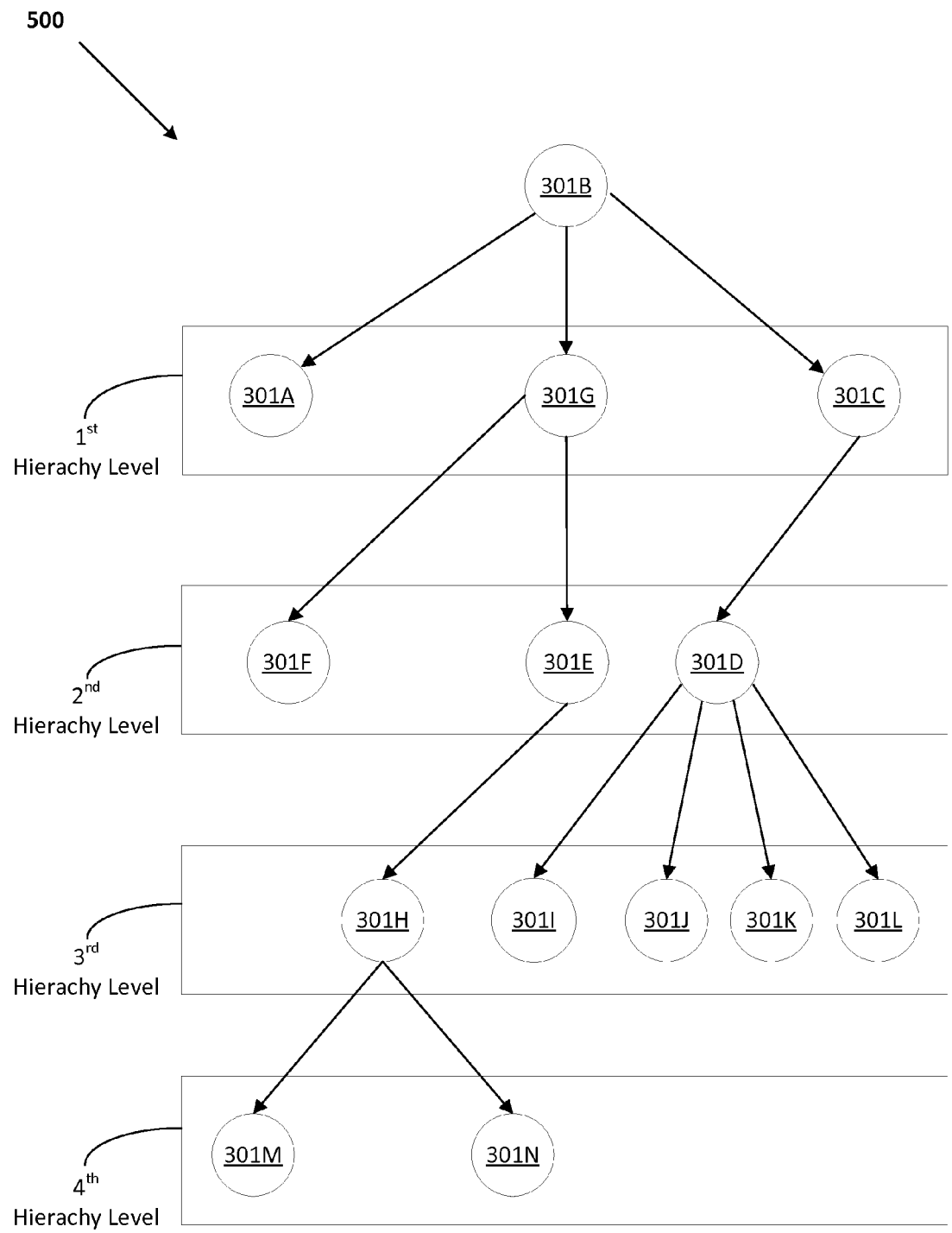
FIG. 5 is a shortest path tree used to propagate copies of data according to an embodiment of the invention.

FIG. 5 illustrates shortest path tree 500 used to determine the paths along which copies of data will be transmitted. For example, data may be copied from 301B to 301G and from 301G to 301E. Alternatively, the data may be copied from 301B to 301E via 301C and 301D. Given that propagation manager 185 determined the path including 301G to be the shortest, shortest path tree 500 includes that path.

Nodes 301A-N are arranged in a hierarchy based on the shortest path of copying to each node. For example, as a result of the shortest path tree calculation, source node 301B will copy data directly to nodes 301A, 301G, and 301C. Nodes 301A, 301G, and 301C are, therefore, in the first level of the hierarchy. Similarly, nodes 301D-F are in the second level of the hierarchy, nodes 301H-L are in the third level of the hierarchy, and nodes 301M-N are in the fourth level of the hierarchy.

Returning to FIG. 2A, at block 212, propagation manager 185 determines an ordering for each child vertex of the root of the shortest path tree in descending order. In one embodiment, propagation manager 185 places the child vertices (of the source datastore) in descending order according to a number of unique clusters to which the descendants of the child vertex belong. For example, the child vertices of source node 301B are illustrated in the first level of hierarchy in FIG. 5. Node 301A has no descendants. Node 301G has five descendants: two child vertices, 301F and 301E, one grandchild vertex, 301H, and two great grandchild vertices, 301M and 301N. Node 301C has five descendants: one child vertex, 301D, and four grandchild vertices, 301I-L. Referring to FIG. 4, the descendants of node 301 G represent three different clusters—node 301F is in cluster 401A, nodes 301E and 301H are in cluster 401 C, and nodes 301M and 301N are in cluster 401D. The descendants of node 301C represent two different clusters—node 301K is in cluster 401C, and nodes 301D, 301I, 301J, and 301L are in cluster 401B. In this example, the node with the highest number of descendants that belong to unique clusters, is ranked first. Node 301C, which has only five descendants in two unique clusters will be ranked after node 301G, which has five descendants in three unique clusters. Node 301A which has no descendants will be ranked after node 301C.

The ordering of each child vertex can be additionally or alternatively determined by basing the order upon the number of children/descendants of each child vertex, the resource utilization of each child vertex's corresponding datastore, the I/O latency of each child vertex's corresponding datastore, the network latency of each child vertex's corresponding datastore (with respect to each other host device or each other datastore), or any combination thereof. For example, if nodes 301G and 301C were to both have descendants that belong to three unique clusters, but node 301C had a greater number of descendants, propagation manager 185 may rank node 301C higher in the order than node 301G.

In another embodiment, the ordering of the each child vertex can be determined by the number of descendants in a particular generation beneath the child vertex that belong to unique clusters. For instance, using the same example described above, the ordering of the child vertices of Node 301B could be based on the highest number of grandchildren of each child vertex that belong to unique clusters. The child vertices of source node 301B and their corresponding grandchild vertices are illustrated in the first and third levels of hierarchy in FIG. 5, respectively. Node 301A has no grandchildren. Node 301C has four grandchildren, 301I-L. Node 301G has one grandchild vertex, 301H. Referring to FIG. 4, the grandchild of node 301 G represents only one cluster—node 301H is in cluster 401 C. The grandchildren of node 301C represent two different clusters—node 301K is in cluster 401C, and nodes 301I, 301J, and 301L are in cluster 401B. In this example, node 301C, which has the highest number of grandchildren who belong to unique clusters, is ranked first. Node 301G, which has only one grandchild in one unique cluster will be ranked after node 301C. Node 301A which has no descendants will be ranked after node 301G. In another embodiment, the ordering of the each child vertex can be determined using the number of unique clusters represented by descendants within a threshold number of generations. For example, propagation manager 185 may determine the number of unique clusters represented by descendants within one, two, three, or another number of generations beneath each child vertex in the first hierarchy level. As stated above, the ordering of each child vertex can be further refined by basing the order upon the number of children/descendants of each child vertex, the resource utilization of each child vertex's corresponding datastore, the I/O latency of each child vertex's corresponding datastore, network latency between datastores, or any combination thereof.

Returning to FIG. 2A, at block 214, propagation manager 185 copies the data from the source datastore to a destination datastore represented as a child vertex of the source datastore, e.g., based upon the determined ordering. In one embodiment, the copying of the data is performed by propagation agent(s) 180. For example, a source propagation agent 180 requests data from source datastore 150 and transmits the data to a destination propagation agent 180 to store with destination datastore 150. In another embodiment, the copying of the data is performed by both propagation manager 185 and propagation agent(s) 180.

Propagation manager 185 determines, at block 216, if the copying of the data from the source datastore to one or more of the destination datastores has completed within a threshold period of time. If the copying has not been completed, method 200 moves to block 222 of FIG. 2B (described below). If the copying has been completed, at block 218, propagation manager 185 determines whether a threshold number of copies has been reached. If the threshold number of copies has been reached, method 200 returns to block 210 and propagation manager 185 determines an updated shortest path, as described above. The threshold number of copies is a predetermined number of copies used by propagation manager 185 and/or propagation agent(s) 180 to refine the selection of paths for copying the data. For example, a default value or administrator set value for the threshold may be ten. Once the data has been copied (directly or indirectly) from a source datastore to ten destination datastores, method 200 returns to block 210 and propagation manager 185 determines an updated shortest path.

In one embodiment, the updated shortest path is determined using one or more different source datastores 150 (in addition to or as an alternative to the original source datastore 150). For example, with the threshold number of copies having been made, additional source datastores 150 are now available to propagate additional copies. As a result, propagation manager 185 may use a multi-source shortest path tree algorithm to determine the updated shortest path tree(s).

If the threshold number of copies has not been reached, method 200 proceeds to block 220, in FIG. 2A. At block 220, propagation manager 185 promotes the child vertex of the source datastore to a new source datastore. For example, in FIG. 5, the data is copied from source datastore 301B to the child vertex of the source datastore, datastore 301G. The child vertex 301G becomes the new source datastore after completing the copying of the data from node 301B.

After the promotion, propagation manager 185 returns to block 212 and resumes method 200 as described above. For example, with the promotion of datastore 301G to the new source datastore, datastores represented by child vertices of datastore 301G (datastores 301E and 301F) are ordered and data is copied to each of them in the descending order.

As described above, if the copying performed by propagation manager 185 at block 216 in FIG. 2A has not been completed within a threshold period of time, method 200 proceeds to block 222 of FIG. 2B. At block 222, propagation manager 185 determines whether one or more datastores 150 has exceeded a performance threshold during the copying of the data to the datastore or during the copying of the data from the datastore. The performance threshold is a predetermined value based on the measurements of resource utilization or I/O latency of datastores 150, both of which are described above. For example, the performance threshold may be set to an expected, average, or above-average value for resource utilization or I/O latency and propagation manager 185 (or propagation agent 180) determines that the current resource utilization or I/O latency exceeds the performance threshold during the copying of data.

If the performance threshold has not been exceeded, then method 200 returns to block 214 and continues with method 200 as described above. If, however, the one or more datastores 150 involved in the copying process exceed the performance threshold, at block 224, propagation manager 185 suspends the copying of the data to the datastore 150 involved in the copying process. For example, propagation agent(s) 180 sets the threshold to a value of 75% of the resource utilization. If a datastore 150 involved in the copying process reports to propagation manager 185 via propagation agent(s) 180 that the datastore 150 exceeds 75% resource utilization prior to or during the copying of data, method 200 proceeds to block 224. At block 224, propagation manager 185 suspends the copying of the file to the datastore 150 in response to that datastore 150 exceeding the threshold.

After the copying is suspended at block 224 of FIG. 2B, method 200 proceeds to block 218 and propagation manager 185 determines if a threshold number of copies has been reached, as described above. If the threshold number of copies has not been reached, copying of data continues (for datastores other than the suspended datastore). If the threshold number of copies has been reached, propagation manager 185 determines an updated shortest path tree and propagation manager 185 and/or propagation agent(s) 180 resume copying the data to the datastore that exceeded the threshold using the updated shortest path tree.

Figure 6:
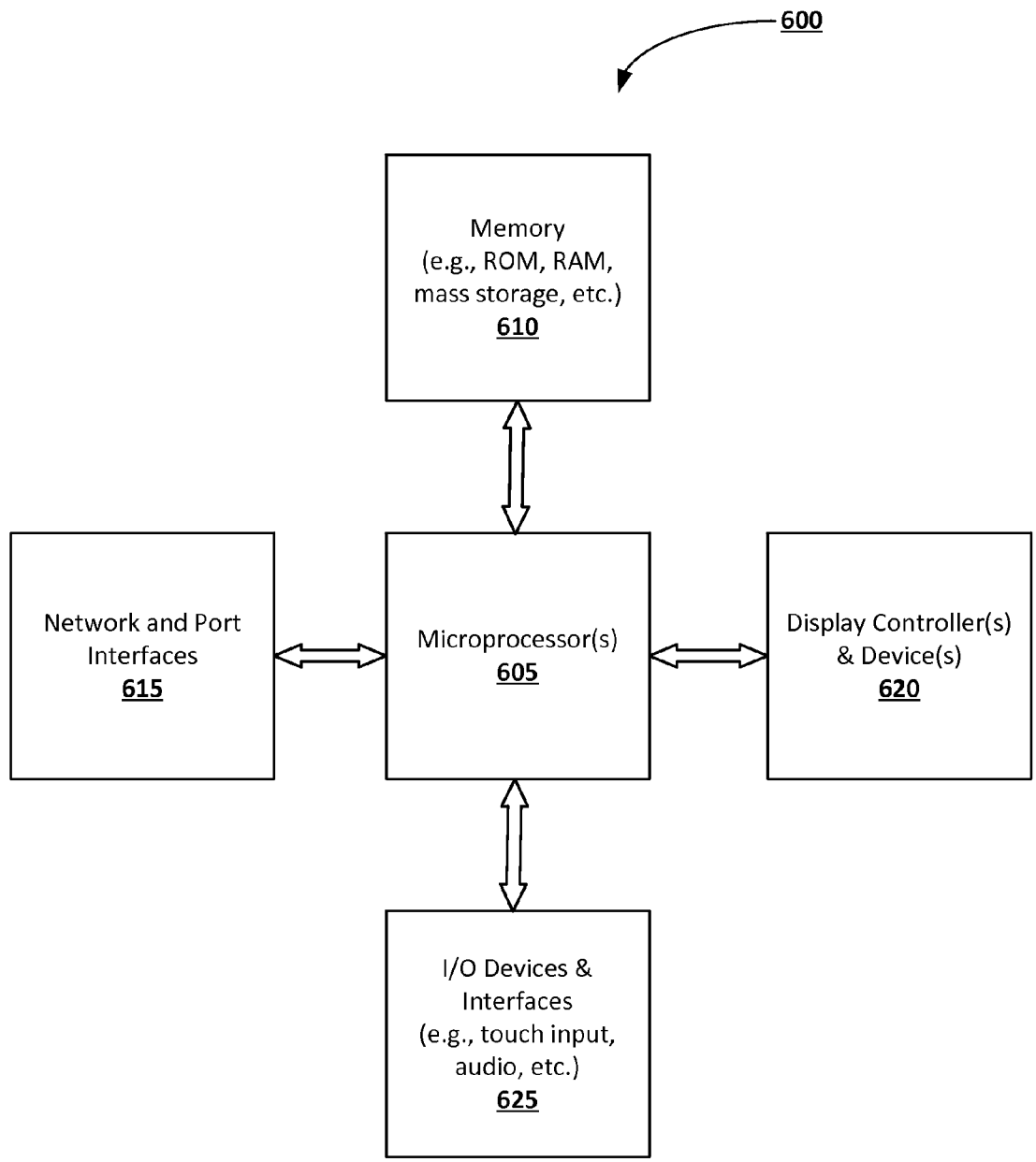
FIG. 6 illustrates, in block diagram form, an exemplary processing system to implement the intelligent propagation of copies of data throughout a plurality of datastores.

FIG. 6 illustrates, in block diagram form, processing system 600 to implement the intelligent propagation of copies of data throughout a plurality of datastores. Data processing system 600 includes one or more microprocessors 605 and connected system components (e.g., multiple connected chips). Alternatively, data processing system 600 is a system on a chip.

Data processing system 600 includes memory 610, which is coupled to microprocessor(s) 605. Memory 610 may be used for storing data, metadata, and programs for execution by the microprocessor(s) 605. Memory 610 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 610 may be internal or distributed memory.

Data processing system 600 includes network and port interfaces 615, such as a port, connector for a dock, or a connector for a USB interface, FireWire, Thunderbolt, Ethernet, Fibre Channel, etc. to connect the system 600 with another device, external component, or a network. Exemplary network and port interfaces 615 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 600 with another device, external component, or a network and receive stored instructions, data, tokens, etc.

Data processing system 600 also includes display controller and display device 620 and one or more input or output ("I/O") devices and interfaces 625. Display controller and display device 620 provides a visual user interface for the user. I/O devices 625 allow a user to provide input to, receive output from, and otherwise transfer data to and from the system. I/O devices 625 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 6.

Data processing system 600 is an exemplary representation of one or more of the client device 105, administrator device 106, VIM server 130, physical computer 135, and VMMS 140 described above. Data processing system 600 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 600 may be a network computer, server, or an embedded processing device within another device or consumer electronic product. As used herein, the terms computer, device, system, processing system, processing device, and "apparatus comprising a processing device" may be used interchangeably with data processing system 600 and include the above-listed exemplary embodiments.

It will be appreciated that additional components, not shown, may also be part of data processing system 600, and, in certain embodiments, fewer components than that shown in FIG. 6 may also be used in data processing system 600. It will be apparent from this description that aspects of the inventions may be embodied, at least in part, in software. That is, the computer-implemented method 200 may be carried out in a computer system or other data processing system 600 in response to its processor or processing system 605 executing sequences of instructions contained in a memory, such as memory 610 or other non-transitory machine-readable storage medium. The software may further be transmitted or received over a network (not shown) via network interface device 615. In various embodiments, hardwired circuitry may be used in combination with the software instructions to implement the present embodiments. Thus, the techniques are not limited to any specific combination of hardware circuitry and software, or to any particular source for the instructions executed by data processing system 600.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
    copying, by a processing device, data on a plurality of datastores, wherein the copying of the data includes determining a shortest path tree from a source datastore at a root of the shortest path tree to a remainder of the plurality of datastores;
    determining, by a processing device, that one of the plurality of datastores has exceeded a threshold during the copying of the data to the datastore or during the copying of the data from the datastore, wherein the threshold is based on resource utilization, network latency, or input/output (I/O) latency of the datastore;
    suspending, by a processing device, the copying of the data to the datastore in response to the datastore exceeding the threshold;
    determining, by a processing device, an updated shortest path tree from a source datastore at a root of the shortest path tree to the datastore; and
    resuming, by a processing device, the copying of the data to the datastore using the updated shortest path tree.

2. The computer-implemented method of claim 1, further comprising:
    generating a snapshot of a virtual machine from the source datastore at the root of the shortest path tree; and
    running a copy of the virtual machine on a host device using the snapshot while the copying is performed, wherein the data that is copied from the source datastore to one or more of the plurality of datastores is the virtual machine.

3. The computer-implemented method of claim 1, further comprising:
    determining a distance value of a path between each of the plurality of datastores based upon a network performance measurement between the datastores; and
    performing a graph cluster analysis using the distance values to create a plurality of clusters, wherein each cluster includes one or more of the datastores within close proximity to one another based upon the distance values.

4. The computer-implemented method of claim 3, further comprising:
    determining a performance value for each datastore, wherein the datastore performance value is based on resource utilization, network latency, or I/O latency of the corresponding datastore; and
    modifying the distance values using corresponding datastore performance values of one or more datastores in the corresponding path, wherein the graph cluster analysis uses the modified distance values.

5. The computer-implemented method of claim 3, wherein the determination of the shortest path tree or the updated shortest path tree includes representing each datastore as a vertex in the shortest path tree, and ordering each child vertex of the root in descending order according to a number of unique clusters to which descendants of the child vertex belong.

6. The computer-implemented method of claim 5, wherein the resuming the copying of the data on the datastore using the updated shortest path tree is based on the ordering each child vertex of the root in descending order according to a number of unique clusters to which descendants of the child vertex belong.

7. The computer-implemented method of claim 5, wherein the ordering each child vertex in the shortest path tree or the updated shortest path tree in descending order is further based upon a number of children of each child vertex, resource utilization of each child vertex's corresponding datastore, I/O latency of each child vertex's corresponding datastore, or network latency of each child vertex's corresponding datastore.

8. The computer-implemented method of claim 5, wherein copying the data comprises:
  copying the data from the source datastore to a datastore represented by a first child vertex of the source datastore;
  promoting the first child vertex to a new source datastore upon completion of the copying of the data to the first child vertex;
  ordering each child vertex of the new source datastore in descending order according to a number of unique clusters to which descendants of the child vertex of the new source datastore belong; and
  copying the data from the new source datastore to one or more of the plurality of datastores in the descending order of the child vertices of the new source datastore.

9. The computer-implemented method of claim 5 wherein the determining an updated shortest path tree is in response to a threshold number of times the data is copied to the plurality of datastores, the updated shortest path tree including an updated source datastore that is one of the source datastore and another datastore storing a copy of the data, the method further comprising:
  ordering each child vertex of the updated source datastore in descending order according to a number of unique clusters to which descendants of the child vertex of the updated source datastore belong; and
  copying the data from the updated source datastore to one or more of the plurality of datastores in the descending order of the child vertices of the updated source datastore.

10. A non-transitory computer-readable medium storing instructions, which when executed by a processing device, cause the processing device to perform a method comprising:
  copying data on a plurality of datastores, wherein the copying of the data includes determining a shortest path tree from a source datastore at a root of the shortest path tree to a remainder of the plurality of datastores;
  determining that one of the plurality of datastores has exceeded a threshold during the copying of the data to the datastore or during the copying of the data from the datastore, wherein the threshold is based on resource utilization, network latency, or input/output (I/O) latency of the datastore;
  suspending the copying of the data to the datastore in response to the datastore exceeding the threshold;
  determining an updated shortest path tree; and
  resuming the copying of the data to the datastore using the updated shortest path tree.

11. The non-transitory computer-readable medium of claim 10, the method further comprising:
  generating a snapshot of a virtual machine from the source datastore at the root of the shortest path tree; and
  running a copy of the virtual machine on a host device using the snapshot while the copying is performed, wherein the data that is copied from the source datastore to one or more of the plurality of datastores is the virtual machine.

12. The non-transitory computer-readable medium of claim 10, the method further comprising:
  determining a distance value of a path between each of the plurality of datastores based upon a network performance measurement between the datastores; and
  performing a graph cluster analysis using the distance values to create a plurality of clusters, wherein each cluster includes one or more of the datastores within close proximity to one another based upon the distance values.

13. The non-transitory computer-readable medium of claim 12, the method further comprising:
  determining a performance value for each datastore, wherein the datastore performance value is based on resource utilization, network latency, or I/O latency of the corresponding datastore; and
  modifying the distance values using corresponding datastore performance values of one or more datastores in the corresponding path, wherein the graph cluster analysis uses the modified distance values.

14. The non-transitory computer-readable medium of claim 12, wherein the determination of the shortest path tree or the updated shortest path tree includes representing each datastore as a vertex in the shortest path tree, and ordering each child vertex of the root in descending order according to a number of unique clusters to which descendants of the child vertex belong.

15. The non-transitory computer-readable medium of claim 14, wherein the resuming the copying of the data on the datastore using the updated shortest path tree is based on the ordering each child vertex of the root in descending order according to a number of unique clusters to which descendants of the child vertex belong.

16. The non-transitory computer-readable medium of claim 14, wherein the ordering each child vertex in the shortest path tree or the updated shortest path in descending order is further based upon a number of children of each child vertex, resource utilization of each child vertex's corresponding datastore, I/O latency of each child vertex's corresponding datastore, or network latency of each child vertex's corresponding datastore.

17. The non-transitory computer-readable medium of claim 14, wherein copying the data comprises:
  copying the data from the source datastore to a datastore represented by a first child vertex of the source datastore;
  promoting the first child vertex to a new source datastore upon completion of the copying of the data to the first child vertex;
  ordering each child vertex of the new source datastore in descending order according to a number of unique clusters to which descendants of the child vertex of the new source datastore belong; and
  copying the data from the new source datastore to one or more of the plurality of datastores in the descending order of the child vertices of the new source datastore.

18. The non-transitory computer-readable medium of claim 14, wherein the determining an updated shortest path tree is in response to a threshold number of times the data is copied to the plurality of datastores, the updated shortest path tree including an updated source datastore that is one of the source datastore and another datastore storing a copy of the data, the method further comprising:

ordering each child vertex of the updated source datastore in descending order according to a number of unique clusters to which descendants of the child vertex of the updated source datastore belong; and copying the data from the updated source datastore to one or more of the plurality of datastores in the descending order of the child vertices of the updated source datastore.

19. An apparatus comprising:

a processing device, wherein the processing device executes instructions that cause the apparatus to perform a method comprising:

copying data on a plurality of datastores, wherein the copying of the data includes determining a shortest path tree from a source datastore at a root of the shortest path tree to a remainder of the plurality of datastores;

determining that one of the plurality of datastores has exceeded a threshold during the copying of the data to the datastore or during the copying of the data from the datastore, wherein the threshold is based on resource utilization, network latency, or input/output (I/O) latency of the datastore;

suspending the copying of the data to the datastore in response to the datastore exceeding the threshold;

determining an updated shortest path tree; and resuming the copying of the data to the datastore using the updated shortest path tree.

20. The apparatus of claim 19, the method further comprising:

determining a distance value of a path between each of the plurality of datastores based upon a network performance measurement between the datastores; and performing a graph cluster analysis using the distance values to create a plurality of clusters, wherein each cluster includes one or more of the datastores within close proximity to one another based upon the distance values, wherein the determination of the shortest path tree or the updated shortest path tree includes representing each datastore as a vertex in the shortest path tree, and ordering each child vertex of the root in descending order according to a number of unique clusters to which descendants of the child vertex belong.

\* \* \* \* \*